US009487633B2

(12) United States Patent
Cardinali

(10) Patent No.: US 9,487,633 B2
(45) Date of Patent: Nov. 8, 2016

(54) COMPOUND FOR REALIZATION OF MODIFIED BITUMEN FOR ASPHALTS

(71) Applicant: TECNOFILM S.P.A., Sant'Elpidio a Mare (IT)

(72) Inventor: Bruno Cardinali, Fermo (IT)

(73) Assignee: TECNOFILM S.P.A., Santelpidio a Mare (FM) (IT)

( * ) Notice: Subject to any disclaimer, the term of this patent is extended or adjusted under 35 U.S.C. 154(b) by 72 days.

(21) Appl. No.: 14/354,412

(22) PCT Filed: Oct. 24, 2012

(86) PCT No.: PCT/EP2012/071087
§ 371 (c)(1),
(2) Date: Apr. 25, 2014

(87) PCT Pub. No.: WO2013/064408
PCT Pub. Date: May 10, 2013

(65) Prior Publication Data
US 2015/0038621 A1   Feb. 5, 2015

(30) Foreign Application Priority Data

Nov. 3, 2011 (IT) .............................. AN2011A0150

(51) Int. Cl.
*C08J 3/05* (2006.01)
*C08L 53/02* (2006.01)
*C08L 95/00* (2006.01)
*C08L 17/00* (2006.01)
*C08J 3/20* (2006.01)
*C08J 3/00* (2006.01)
*C08L 91/00* (2006.01)

(52) U.S. Cl.
CPC ................. *C08J 3/203* (2013.01); *C08J 3/005* (2013.01); *C08L 17/00* (2013.01); *C08L 91/00* (2013.01); *C08L 95/00* (2013.01); *C08J 2317/00* (2013.01); *C08J 2325/10* (2013.01); *C08L 53/02* (2013.01); *C08L 2555/34* (2013.01); *C08L 2555/84* (2013.01)

(58) Field of Classification Search
CPC ...... C08J 3/005; C08J 3/203; C08J 2317/00; C08J 2325/10
USPC .................................................. 524/68, 526
See application file for complete search history.

(56) References Cited

U.S. PATENT DOCUMENTS

| 5,510,419 | A | * | 4/1996 | Burgoyne | ............... | B29B 7/002 |
| | | | | | | 525/331.9 |
| 6,262,175 | B1 | * | 7/2001 | Jury | ...................... | C08L 19/003 |
| | | | | | | 525/185 |
| 6,815,510 | B2 | * | 11/2004 | Rouse | ..................... | C08J 11/18 |
| | | | | | | 521/41 |
| 6,818,687 | B2 | | 11/2004 | Memon | | |
| 2007/0264495 | A1 | * | 11/2007 | Resmini | ............... | C08L 19/003 |
| | | | | | | 428/339 |

FOREIGN PATENT DOCUMENTS

| EP | 1314525 A1 | 5/2003 | |
| EP | 2055745 A1 | 5/2009 | |
| ES | EP 2055745 A1 * | 5/2009 | .............. C08L 95/00 |
| WO | 0159008 A1 | 8/2001 | |
| WO | 2008083451 A1 | 7/2008 | |
| WO | 2011074003 A2 | 6/2011 | |

OTHER PUBLICATIONS

Manuel Navarro Gonzalez et al: "Influence of Rubber Pre-Processing on the Rheological Behavior of SBS/Crumb Rubber-Modified Bitumen", Annual Transactions of the Nordic Rheology Society, vol. 17, 2009, Jan. 1, 2009, pp. 1-7, XP055045998, Retrieved from the Internet: URL:http://www.nordicrheologysociety.org/0 pentransactions/2009/Oral presentations/Application of Rheology/ NavarroWagner 2009.pdf.
Francisco Sinis: "Literature review of recycling of by-products in road construction in Europe (Deliverable 5—Sam-06-DE05)", SAMARIS, Mar. 15, 2004, pp. 1-219, XP055018436, Retrieved from the Internet: URL:http://www.fehrl.org/index.php?m=32&mo de=download&id file=790.
Ahmed I: "Use of Waste Materials in Highway Construction", Joint Transportation Research Program Technical Report Series, Purdue University, West Lafayette, IN No. Report No. FHWA/IN/JHRP-91/03 Jan. 1, 1991, pp. 1-141, XP002668583, DOI: 10.5703/ 1288284313423 Retrieved from the Internet: URL:http://docs.lib. purdue.edu/cgi/viewcon tent.cgi?article=1771&context=jtrp&sei-redir=1&referer=http%3A%2F%2.
Anonymous: "Crumb Rubber Modifier, Workshop Notes", Jan. 1, 1993, pp. 1-295, XP055031446, Retrieved from the Internet: URL:http://isddc.dot.gov/OLPFiles/FHWA/013377.pdf.
Khaldoun M Shatanawi et al: "Effects of furfural activated crumb rubber on the properties of rubberized asphalt", Construction and Building Materials, Elsevier, Netherlands, vol. 28, No. 1, Aug. 16, 2011, pp. 96-103, XP028353548, ISSN: 0950-0618, DOI: 10.1016/ J.CONBUILDMAT.2011.08.041.
Baha Vural KK et al: "Laboratory comparison of the crumb-rubber and SBS modified bitumen and hot mix asphalt", Construction and Building Materials, Elsevier, Netherlands, vol. 25, No. 8, Mar. 1, 2011, pp. 3204-3212, XP028199827, ISSN: 0950-0618, DOI: 10.1016/J.CONBUILDMAT.2011.03.005.
Jeong K D et al: "Interaction effects of crumb rubber modified asphalt binders", Construction and Building Materials, Elsevier, Netherlands, vol. 24, No. 5, May 1, 2010, pp. 824-831, XP026925831, ISSN: 0950-0618, DOI: 10.1016/J. CONBUILDMAT.2009.10.024.

* cited by examiner

Primary Examiner — Kelechi Egwim
(74) Attorney, Agent, or Firm — Egbert Law Offices, PLLC

(57) ABSTRACT

A production method of a compound for realization of modified bitumen for asphalts is disclosed, and includes the following steps: grinding of vulcanized rubber to obtain vulcanized crumb rubber with granulometry lower than 0.4 mm; mixing of the vulcanized crumb rubber, SBS and lubricant in an extruder, wherein the weight percentage of lubricant is between 1% and 50% compared to mixture weight and the vulcanized crumb rubber is in a weight percentage of 70-100% compared to SBS weight; in such way to obtain an extruded compound containing the vulcanized crumb rubber, SBS and lubricant.

6 Claims, No Drawings

COMPOUND FOR REALIZATION OF MODIFIED BITUMEN FOR ASPHALTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a compound for realization of modified bitumen.

Although the term "bitumen" will be prevailingly used in the description below, it is understood that the present invention extends to the field of asphalts, in particular for road surfaces.

2. Description of Related Art Including Information Disclosed Under 37 CFR 1.97 and 37 CFR 1.98.

Bitumens are complex thermoplastic products composed of very different elements: asphaltenes and malthenes. Bitumens have excellent adhesive properties, but poor mechanical properties, especially according to temperature. In fact, bitumens have a very low hardness at ambient temperature (25° C.). Moreover, at temperatures below 0° C. (cold), bitumens are rigid and fragile, whereas at temperatures above 38° C. (hot), bitumens are plastic, soft and very adhesive. For this reason, bitumens cannot be used for most road or building applications.

The modification of bitumens by means of chemical and polymer additives is extremely important in order to essentially modify the nature of bitumens, thus making modified bitumens suitable for the most diverse industrial uses.

The modification of asphalts and bitumens using granules derived from grinding end-of-life tires is known. The advantages that can be obtained from these initiatives are both of technical and environmental nature.

The technical benefits derive from the performance of bitumen modified with the addition of crumb rubber, i.e. noise reduction, longer life time of finished products, considerably increased elasticity, reduction of fractures and their propagation in manufactured items. Obviously, the above is according to the capacity of crumb rubber to get wet because of the host bitumen. In other words, rubber particles must swell and in chemical-physical terms this means that the solubility parameter of the two products (rubber and bitumen) must be numerically very close so that the solvent part of bitumen, the malthenic fraction, can penetrate the solid particles of rubber granules and form, outside the solid particle, a practically gelatinous phase that is very active in adhesion and cohesion with the remaining bitumen part. For example, Nitrile Rubber (NBR) swells considerably less in bitumens than Styrene-Butadiene-Rubber (SBr). Therefore, with the same concentration and granulometry, the performance of bitumen modified with NBR granules will be considerably lower than the one of bitumen modified with SBr granules.

The environmental benefits derive from the possibility of using a material that can be hardly used in other activities and is available in large quantities, in highly technological applications, replacing elastomer polymers of high value and cost.

An interesting modification of bitumens that has been discovered recently relates to the use of a devulcanized variant of rubber granules. This variant allows for producing a portion of material with low molecular weight, soluble in bitumen or asphalt and allows for creating a surface of the residual granule more suitable for cohesion with bitumen, consequently improving the final mechanical characteristics. However, such a technology is expensive and requires the use of specific equipment, such as pirolizers or extruders especially designed to obtain conversion from mechanical to thermal energy in order to achieve the temperatures that are necessary for resolution of intra and intermolecular bonds of vulcanized products. Moreover, such a technology uses ground products from tires with very high granulometry.

It must be considered that granulometry of ground products obtained from end-of-life tires or other similar vulcanized materials, such as for instance shoe soles, rubber hoses, anti-vibrating unions and washer or dishwasher gaskets, are much higher than a minimum size of 0.5 millimeters. Their polymer bases are generally composed of copolymers of Styrene-Butadiene, (SBr), Acryl-Nitrile Butadiene (NBr), Ethylene-Propylene-Diene (EPDM), Natural Rubber (NR) and Butadiene Polymers (Br). Granulometry higher than 0.5 millimeters considerably reduces the capability of vulcanized rubber powders to obtain radical changes of bitumens.

A process known as "dry process" is currently known for production of modified asphalt. Said process provides for using powders derived from grinding vulcanized products (generally tires) with size higher than 0.4 mm, and the replacement of part of mineral grit in asphalt with said powders. Said powders are also used to produce Rubber Asphalt obtained with wet process (in wet phase) to obtain bitumens with better rheological characteristics than basic bitumen. However, the asphalts and bitumens obtained with the known processes are not suitable to obtain the performance that is currently required by national or international specifications for specific applications in the road or building fields.

Several documents describe bitumens modified with recycled tire powder:
SINIS "Literature review of recycling of by-product in road construction in Europe"
AHMED "Use of Waste materials in Highway construction"
US department of transportation "Crumb Rubber Modifier, Workshop Notes"
JEONG "Interaction effects of crumb rubber modified asphalt binders"

These documents, however, do not describe the production of a specific extruded compound to modify asphalts and do not specify the quantities of the various components in order to obtain a specific performance of asphalts.

It is known that bitumens modified with crumb rubber of recycled tires are impaired by compatibilization problems of crumb rubber with bitumen. Such an inconvenience is solved by using catalysts mixed in bitumen.

WO20011/074003 discloses the use of a catalyst for FCC (Catalytic Cracking) plant comprising oil and low value polymers, such as polyolefin polymers. Surely SBS is not a low value polymer.

KHALDOUN "Effect of furfural activated crumb rubber on the properties of rubberized asphalt" describes the use of a furfural catalyst to improve adhesion of crumb rubber to bitumen.

According to the prior art the best performance of modified bitumens is obtained with thermoplastic block copolymers Styrene-Butadiene-Styrene (SBS) in linear or radial configurations that are the most used polymer products for bitumen modification. In fact, said thermoplastic block copolymers (SBS) are the best performing ones in bitumen modification, allowing for achieving the desired characteristics of high temperature softening, penetration at ambient temperature, and low temperature flexibility.

Other block copolymers can be used in bitumen modifications, like SBS. They are block copolymer Styrene-Isoprene-Styrene (SIS) and their hydrogenated derivatives SEBS and SEPS, in addition to other block copolymers that can be obtained with modification of the elastomeric phases not based on Butadiene and Isoprene mixtures, but scarcely used in practice because of high cost.

Thermoplastic homo, copo- or ter-polymers are used and usable for bitumen modifications. They are obtained from monomers, such as Ethylene-Vinyl Acetate (EVA), Ethylene-Propylene (EPM), Ethylene-Propylene-Diene (EPDM), Atactic and Isotactic Propylene (PPa/iso), Polyethylene (LL-DPE, HDPE, LDPE), Polybutadiene and Polybutene, but none of them, either individually or in combination, can give characteristics similar to SBS.

BAHA "Laboratory comparison of crumb-rubber and SBS modified bitumen and hot mix asphalt" describes a comparison between crumb-rubber modified bitumen and SBS modified bitumen. The conclusion of this document is that SBS modified bitumen has much better performance than crumb rubber modified bitumen. Therefore, in order to replace SBS with crumb rubber, while maintaining the same asphalt performance, 1:3 ratio must be applied, meaning that the quantity of crumb rubber must be at least triple than SBS. This is confirmed by the products found on the market. In fact, SBS modified bitumens generally have SBS quantity of 10% in weight. Instead, crumb rubber modified bitumens have a crumb rubber quantity of 30% in weight.

U.S. Pat. No. 6,818,687 discloses an SBS or SBr modified bitumen after vulcanization and grinding; it is not said that bitumen is simultaneously SBS and SBr modified. Such bitumen has storage problems and therefore a viscosity regulator (oil) and a catalyst with acid and sulphurous base are added.

WO2008/083451 discloses a product comprising SBS, crumb rubber and vulcanizing, plasticizing, lubricating and expanding agents. A thermosetting product is obtained and vulcanized. Therefore, said product is not a thermoplastic asphalt-soluble product. In fact, such a product is used to manufacture shoe soles and crumb rubbers is given as filler, i.e. it can be any material that needs not to have special reactions to obtain special technical characteristics. In any case, shoe soles are obtained via molding, not extrusion.

BRIEF SUMMARY OF THE INVENTION

The purpose of the present invention is to eliminate the drawbacks of the prior art, providing a compound that can be used to modify bitumen, is able to give the same performance as SBS with same quantity, is less expensive and at the same time has high technical characteristics and performance in order to be used in roads and building roofing compared to SBS.

This purpose is achieved in accordance with the invention, with the characteristics recited in the attached independent claims.

Advantageous embodiments appear from the dependent claims.

DETAILED DESCRIPTION OF THE INVENTION

By means of experimental tests, the applicant has discovered that by reducing the granulometry of vulcanized rubber particles, with solubility parameter not excessively different from the bitumen used, it is possible to considerably increase the modification effect of the final product.

The lower granulometry of rubber particles and the closer the solubility parameter to the bitumen used, the better the modification effect will be.

The solubility parameter of bitumen is generally rather different from the vulcanized polymer product obtained from tire grinding. For this reason, suitable cohesion forces are not developed between the two elements. Technically speaking, bitumen does not get vulcanized crumb rubber sufficiently wet.

Considerable results are obtained for vulcanized rubber particles with granulometry lower than 0.4 mm, preferably with granulometry of 90-320 micron.

By mixing said vulcanized rubber particles with bitumen and bringing bitumen to the melt state, modified bitumen is obtained, with characteristics very similar and comparable with bitumens modified with the use of elastomeric polymers only, such as block copolymers SBS, which are the best and most performing ones. The percentage in weight of the vulcanized rubber particles is 4-20%, preferably 15% with respect to the total weight of modified bitumen.

In order to obtain good results, it is necessary to select the vulcanized elastomeric products, which must have adhesion to bitumen as characteristic. The selection of the chemical nature of crumb rubber was made in the laboratory, preparing reduced-scale samples of bitumen and vulcanized crumb rubber mixtures with granulometry lower than 0.4 mm. Said tests measured the wetting capability of a standard bitumen with 160/220 penetration at 25° C. in various types of crumb rubber. Said wetting capability was measured by evaluating the lower temperature flexibility of said samples.

Infrared spectroscopic analyses of samples demonstrated that the best results are obtained with recycled vulcanized rubbers composed of polymers of Styrene-Butadiene, Butadiene and Isoprene type and relevant mixtures. Vehicle tires are ideal for such an application, being formed of the aforementioned polymer elements, although in considerably different concentrations.

Recycled vulcanized crumb rubber with controlled granulometry was obtained from grinding, in some cases also cryo-grinding, with equipment provided with very effective cooling systems and suitable for screening of powders to the desired size.

Table 1 shows the granulometry of vulcanized rubber powders obtained from grinding End-of-Use Tires (PFU) and relevant screening.

TABLE 1

| Screen mesh size in μm | SAMPLES and QUANTITIES in g | | |
|---|---|---|---|
| | PFU 1 | PFU 2 | PFU 3 |
| 500 | 0 | 0 | 0 |
| 400 | 41 | 0 | 0 |
| 300 | 36 | 15 | 0 |
| 200 | 23 | 44 | 10 |
| 100 | 0 | 37 | 64 |
| 50 | 0 | 4 | 21 |
| <50 | 0 | 0 | 5 |
| Weighted mean in micron | 318 | 172 | <99 |

As shown in Table 1, the three samples of vulcanized rubber powders PFU 1, PFU 2 and PFU 3 respectively have granulometry of 318,172 and approximately 99 micron. Said granulometry was obtained from the weighted mean of the fractions obtained during screening.

Table 2 shows the examples of comparative tests carried out on five samples (CO, C1, C2, C3, C4, Cp): a first sample (CO) composed of standard (not modified) bitumen with 160/220 penetration at 25° C.; three samples of modified bitumen (C1, C2, C3) obtained by mixing standard bitumen of sample CO with three samples of vulcanized rubber powders PFU 1, PFU 2 and PFU 3 in (85/15) weight ratio; a fifth comparison sample (Cp) obtained by mixing standard bitumen of sample (CO) with a block copolymer SBS of radial type in (85/15) weight ratio.

TABLE 2

| | SAMPLE | | | | |
|---|---|---|---|---|---|
| | C0 | C1 | C2 | C3 | CP |
| Bitumen 169/220 | 100 | 85 | 85 | 85 | 85 |
| PFU 1 | | 15 | | | |
| PFU 2 | | | 15 | | |
| PFU 3 | | | | 15 | |
| radial SBS | | | | | 15 |
| Analytical results | | | | | |
| Viscosity 180° C. (mPa s) | Low. 1000 | 56000 | 48000 | 39000 | 3000 |
| Ring-ball (° C.) | 38 | 105 | 113 | 121 | 114 |
| Penetr. at 25° C. (dmm) | 175 | 27 | 32 | 45 | 50 |
| Cold flexibility (° C.) | >0 | −15 | −17 | −23 | −27 |

The characteristics shown in the table (Viscosity at 180° C. (mPa*s), Ring-ball (° C.); Penetration at 25° C. (dmm); Cold flexibility (° C.)) were determined with the following UNI methods, respectively: EN13702, EN 1427, EN 1426 and EN 1109.

As shown in Table 2, tests on samples (C1, C2, C3) of bitumen modified with crumb rubber having a low granulometry showed different characteristics compared to the test sample (Cp) modified with SBS.

The lower the granulometry of crumb rubber, the higher the total exposure surface to bitumen, thus achieving a higher total cohesive strength, by contact, developed between bitumen and solid particles, consequently improving the main physical characteristics of the modified product, as described herein below.

Also resistance of modified bitumen to hot temperatures increases when the granulometry of powders decreases. The Ring-Ball test showed that the sample of modified bitumen (C1) starts deforming at 105° C.; upon decreasing the granulometry of powders, the temperature at which modified bitumen gets deformed increases.

Likewise, resistance to cold temperatures of modified bitumen improves upon reducing the granulometry of powders. The Cold Flexibility test showed that the sample of modified bitumen (C1) starts stiffening and breaking at −15° C.; upon decreasing the granulometry of powders, the temperature at which modified bitumen will break decreases.

Instead, hardness of modified bitumen (measured at 25° C.) slightly decreases when granulometry of the powder decreases.

The needle penetration test at 25° C. shows that the sample of modified bitumen (C1) suffers 27 dmm penetration; upon decreasing granulometry of the powder, needle penetration increases slightly. In any case, also in sample C3 with granulometry of powder lower than 99 micron, hardness is better than the comparison sample (Cp) modified with SBS and much better than the standard non-modified bitumen sample (CO).

However, samples (C1, C2, C3) of bitumens modified with crumb rubber with low granulometry do not give satisfactory results in terms of cold flexibility or results comparable with the test sample (Cp) represented by SBS modified bitumen. In spite of minimizing granulometry of crumb rubber (PFU 3), sample C3 is not comparable with comparison sample Cp. Therefore, crump rubber itself cannot replace SBS in equal quantity.

In order to increase cold flexibility, a sample (C4) of crumb rubber modified bitumen was tested, with the addition of SBS and mineral oil, as shown in Table 3. In sample (C4) the quantity of vulcanized rubber recycled from end-of-life tires (PFU 1) was decreased and lubrication oil and radial SBS were added. Crumb rubber (PFU 1), SBS and lubrication oil were added separately and mixed with bitumen.

TABLE 3

| COMPONENT | WEIGHT PERCENTAGE |
|---|---|
| Bitumen 160/220 | 85 |
| PFU 1 | 5 |
| radial SBS | 5 |
| Lubrication oil | 5 |
| Analytical results | |
| Viscosity 180° C. (mPa * s) | 3500 |
| Ring-ball (° C.) | 92 |
| Penetr. at 25° C. (dmm) | 80 |
| Cold flexibility (° C.) | −24 |

As shown in Table 3, also sample (C4) did not show the desired performance in terms of cold flexibility.

Therefore, the applicant tested a new sample (C5) of modified bitumen, increasing the quantity of crumb rubber (PFU 1) and SBS from 5 to 7.5 parts each, viz. active substance (PFU 1+SBS) is 15 parts, lubrication oil is 5 parts and bitumen remains at 85 parts. Consequently, in such a case, a comparison sample (Cp1) composed of modified bitumen comprising 15 SBS parts, 5 lubrication oil parts and 85 bitumen parts was used.

Table 4 shows a comparison between sample (C5) and comparison sample (Cp1).

TABLE 4

| | SAMPLE | |
|---|---|---|
| | Cp 1 | C5 |
| Bitumen 169/220 | 85 | 85 |
| PFU 1 | | 7.5 |
| Radial SBS | 15 | 7.5 |
| Lubrication oil | 5 | 5 |
| Analytical results | | |
| Viscosity 180° C. (mPa * s) | 3500 | 3300 |
| Ring-ball (° C.) | 105 | 97 |
| Penetr. at 25° C. (dmm) | 46 | 65 |
| Cold flexibility (° C.) | −28 | −26 |

As shown in Figure. 4, the performance of sample C5 improved compared to sample C4. However, the performance of sample C5 is not yet comparable with comparison sample Cp1. For this reason, it was concluded that the same performance of SBS modified bitumen is not obtained by adding PFU and SBS to bitumen.

In view of these unsatisfactory results, the applicant attempted to make an extruded compound (CMP) composed of a mixture of three products:

A) crumb rubber PFU 1 in 37.5% weight percentage
B) radial SBS in 37.5% weight percentage
C) lubrication oil in 25% weight percentage.

Then, a sample (C6) of bitumen modified with extruded compound (CMP) was made. Sample (C6) comprises 85 bitumen parts and 20 extruded compound (CMP) parts. The 20 extruded compound (CMP) parts are composed of 7.5 PFU 1 parts, 7.5 radial SBS parts and 5 lubrication parts.

Table 5 compares the comparison sample (Cp1) (bitumen modified with SBS and lubrication oil), sample (C5) (bitumen modified with crumb rubber, SBS and lubrication oil added separately) and sample (C6) (bitumen modified with extruded compound CMP).

TABLE 5

| | SAMPLE | | |
|---|---|---|---|
| | Cp 1 | C5 | C6 |
| Bitumen 169/220 | 85 | 85 | 85 |
| PFU 1 | | 7.5 | 7.5 |
| Radial SBS | 15 | 7.5 | 7.5 |
| Lubrication oil | 5 | 5 | 5 |
| Analytical results | | | |
| Viscosity 180° C. (mPa * s) | 3500 | 3300 | 3100 |
| Ring-ball (° C.) | 105 | 97 | 116 |
| Penetr. at 25° C. (dmm) | 46 | 65 | 48 |
| Cold flexibility (° C.) | −28 | −26 | −30 |

As shown in Table 5, the performance of sample (C6) is remarkable. The characteristics shown by sample (C6) are by far better than sample (C5) and comparable or even better than the comparison sample (Cp1). Consequently, sample (C6) made it possible to achieve the purpose of the present invention, viz. to replace SBS used to modify bitumens with an inexpensive product with the same performance as SBS with the same quantity.

The considerable difference in the physical properties between samples C5 and C6 derives from the different preparation procedure of modified bitumen: in sample C5 active elements (PFU 1 and SBS) were added individually without any pretreatment, whereas in sample C6 the same active elements (PFU 1 and SBS) were compounded and extruded before addition.

The physical characteristics of sample C6 are definitely better than C5: cold flexibility is lower by 4° C., Ring-ball is higher by 19° C. and Penetration is lower by 17° C.; this is what is normally desired in bitumen modification.

Following is an explanation of the results obtained.

In sample C5, when crumb rubber PFU is mixed directly with bitumen, in spite of the powder status, solid PFU has a very different density from fluid bitumen brought to 160-190° C. Homogenization of said mixture requires special geometry of agitators used to mix bitumen to allow for incorporating the solid (PFU) in bituminous fluid, without any guarantee for a correct effective dispersion of PFU that will affect the final result of the desired properties.

Practically speaking, PFU behaves as an inert filler, but being provided with good intrinsic elasticity, gives certain resilient characteristic to bitumen, which is certainly not comparable with SBS with the same replacement quantities. Moreover, PFU granules are surrounded by bituminous components, which have different solubility parameters, not comparable with PFU. For this reason, no sufficient cohesive forces are developed and consequently phase interruptions are generated.

When SBS is mixed directly in hot bitumen, SBS dissolves. However, a phase separation takes place at cold temperatures and bitumen is incorporated in the three-dimensional network of block copolymer SBS. The polystyrene block is not soluble in bitumen and acts as connection element between the various SBS molecules, promoting the formation of a three-dimensional structure, viz. a polymeric network, which gives elasticity and resistance to modified bitumen. It is approximately the same phenomenon that takes place in concrete used for flooring: if a metal framework, for example a mesh, was not inserted inside, floors would be weak and easily breakable.

Instead, by compounding SBS with PFU at reduced dimension (less than 400 micron) (plasticizing lubrication oil is an aid for extrusion), an intimate connection between SBS and PFU is obtained, because their solubility parameters are compatible. PFU is generally composed of unsaturated polymeric chains and styrenic groups that are perfectly compatible and wettable by SBS, a polymer with the same type of olefinic unsaturation and styrenic groups. Therefore, the cohesive bond developed between SBS and PFU solid granule is strong and increases when granule size decreases, with consequent increment of the surface available for contact, in this case the maximum dispersion activity of solid PFU in SBS polymer matrix is obtained.

This is the principle on which TPV (Thermoplastic Polymers dynamically Vulcanized) elastomers are based, which from rigid polymers, such as Polypropylene, allow for preparing high-performance rubbers.

If vulcanized EPDM particles with micrometric and submicrometric size are incorporated in PP, EPDM has a solubility parameter close to Polypropylene, therefore the vulcanized EPDM solid particle gets wet and is connected to PP, which is a rigid product, and from this combination an elastomer suitable for the most diverse and interesting uses is obtained.

In view of the above, the PFU and SBS compound will combine in fusion with bitumen, but after cooling its three-dimensional network formed of SBS and solid PFU will incorporate the bituminous phase while maintaining its elastic structure with the physical characteristics disclosed in the present invention. In the field of polymers this phenomenon is known as IPN (Interpenetrating Polymer Network) and, when connected to the phenomenon described in the TPV process, contributes to explain the difference in performance between sample C5 and sample C6 according to the invention.

The production process of the compound according to the invention comprises the following steps:
- grinding of vulcanized rubber to obtain vulcanized crumb rubber with granulometry lower than 0.4 mm;
- mixing of vulcanized crumb rubber, SBS and lubricant inside an extruder, wherein the weight percentage of lubricant is between 1% and 50% with respect to the weight of mixture, and vulcanized crumb rubber is in weight percentage 70-100% with respect to SBS weight;
- extrusion of a compound containing said vulcanized crumb rubber, SBS and lubricant.

Advantageously:
- granulometry of vulcanized crumb rubber is between 0.09 and 0.32 mm;
- crumb rubber is obtained from recycled end-of-use tires (PFU);
- SBS weight percentage is equal to weight percentage of vulcanized crumb rubber;
- SBS is preferably of radial type, but can also be linear or a mixture of radial SBS and linear SBS;
- lubricant is in weight percentage between 20-30% with respect to total weight of compound;
- lubricant is a mineral oil;
- crumb rubber and SBS are both in weight percentage between 35% and 42% with respect to total weight of compound;
- extrusion takes place at a temperature between 160-200° C.

The compound obtained from the extruder is cut in chips of any size. Said chips of extruded compound are used to modify bitumens. Bitumen is modified by adding a weight percentage of extruded compound between 5% and 30% with respect to total weight of modified bitumen. Said bitumen modified with extruded compound has a performance similar to SBS modified bitumens, with the same quantity of SBS and extruded compound, but the cost of extruded compound is considerably lower than SBS.

The invention claimed is:

1. A method for producing a compound or a modified bitumen for asphalt, the method comprising:
   grinding a vulcanized rubber so as to produce crumb rubber having a granularity of less than 0.4 millimeters;
   mixing the crumb rubber with only a copolymer of styrene-butadiene-styrene (SBS) and a lubricant in an extruder, the lubricant having a weight percentage of 1% to 50% relative to the total mixture, said crumb rubber having a weight percentage of the total mixture equal to a weight percentage of the total mixture of SBS, wherein the SBS has a weight percent of 35% to 42% with respect to the total mixture; and
   extruding the mixture to obtain an extruded compound containing only the crumb rubber and the SBS and the lubricant, the extruding being at a temperature of between 160° C. and 200° C., wherein the extruded mixture does not contain a curing agent, wherein the extruded mixture contains neither a polyolefin nor a vinyl homopolymer, and wherein the extruded mixture does not contain a coupling agent.

2. The method of claim 1, the granularity of the crumb rubber being between 0.09 and 0.32 millimeters.

3. The method of claim 1, further comprising:
   obtaining the vulcanized rubber from tires.

4. The method of claim 1, the SBS being a radial type.

5. The method of claim 1, the lubricant being of a weight percent of between 20% and 30% of the total mixture.

6. The method of claim 1, the lubricant being mineral oil.

* * * * *